United States Patent [19]

Shimura et al.

[11] 4,186,439
[45] Jan. 29, 1980

[54] ELECTRONIC CASH REGISTER FOR TOTALIZING SALES DATA ON A TIME ZONE BASIS

[75] Inventors: Noriaki Shimura; Yutaka Mizuno, both of Murayama, Japan

[73] Assignee: Casio Computer Co., Ltd., Tokyo, Japan

[21] Appl. No.: 865,450

[22] Filed: Dec. 29, 1977

[51] Int. Cl.² .............................................. G06F 15/20
[52] U.S. Cl. .................................................. 364/405
[58] Field of Search ................... 364/405, 404, 900; 235/7 R, 2; 58/152 R

[56] References Cited

U.S. PATENT DOCUMENTS

| | | | |
|---|---|---|---|
| 3,049,288 | 8/1962 | Becker et al. | 235/7 R |
| 3,330,947 | 7/1967 | Alpert et al. | 364/405 |
| 3,335,407 | 8/1967 | Lange et al. | 364/900 |
| 3,748,452 | 7/1973 | Ruben | 364/405 |
| 3,999,050 | 12/1976 | Pitroda | 58/152 R X |
| 4,003,030 | 1/1977 | Takagi et al. | 364/405 |
| 4,084,238 | 4/1978 | Masuo | 364/405 |

Primary Examiner—David H. Malzahn
Attorney, Agent, or Firm—Frishauf, Holtz, Goodman & Woodward

[57] ABSTRACT

An electronic cash register comprises a keyboard including a data input key and a time zone setting key; a central processing unit coupled to the keyboard; a memory coupled to the central processing unit and having a plurality of memory places for storing accumulated sales amounts on a time zone basis; a time memory coupled to the central processing unit to store time zone defining time data by the operation of the time zone setting key; a timepiece coupled to the time memory to supply current time data; and a comparator coupled to the timepiece and to the time memory to compare current time data from the timepiece with the time data stored in the time memory. The central processing unit includes means for writing entry data in one memory place of the memory according to the time zone determined by the result of a comparison by the comparator when entry data from the keyboard is completed.

12 Claims, 16 Drawing Figures

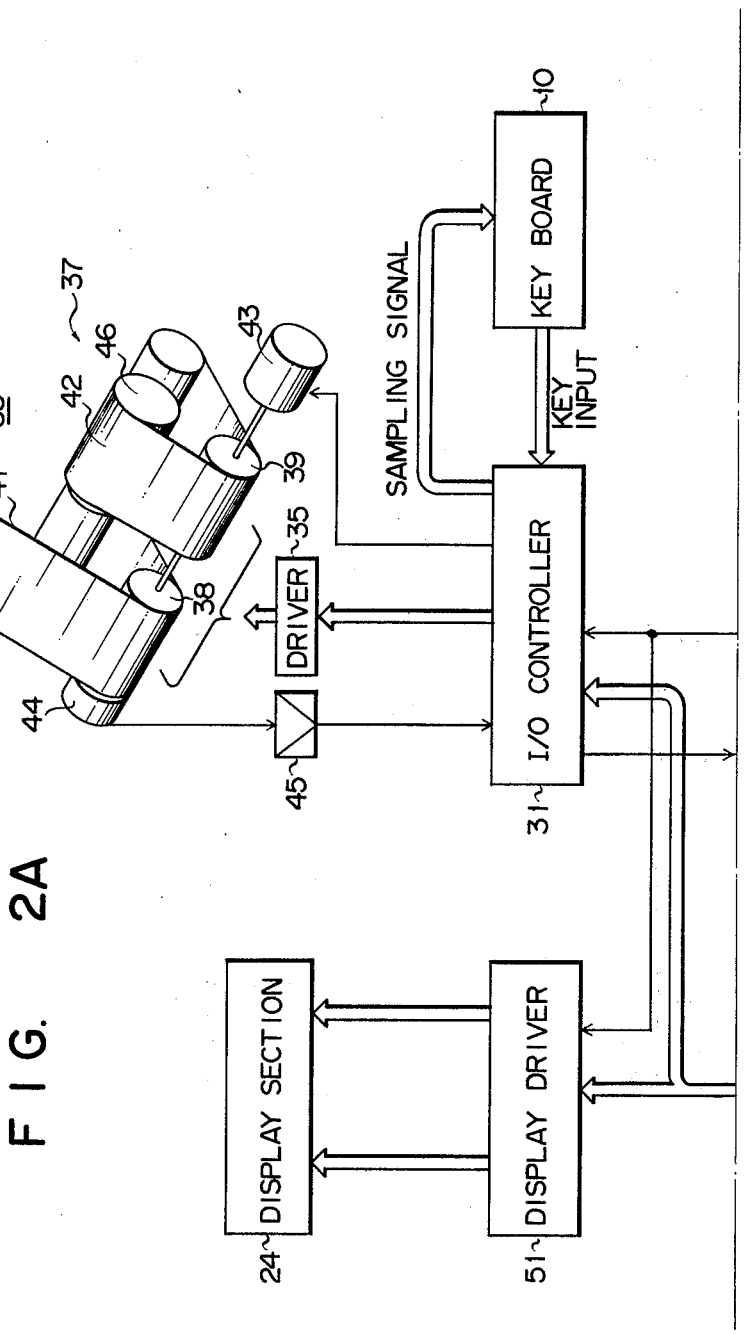

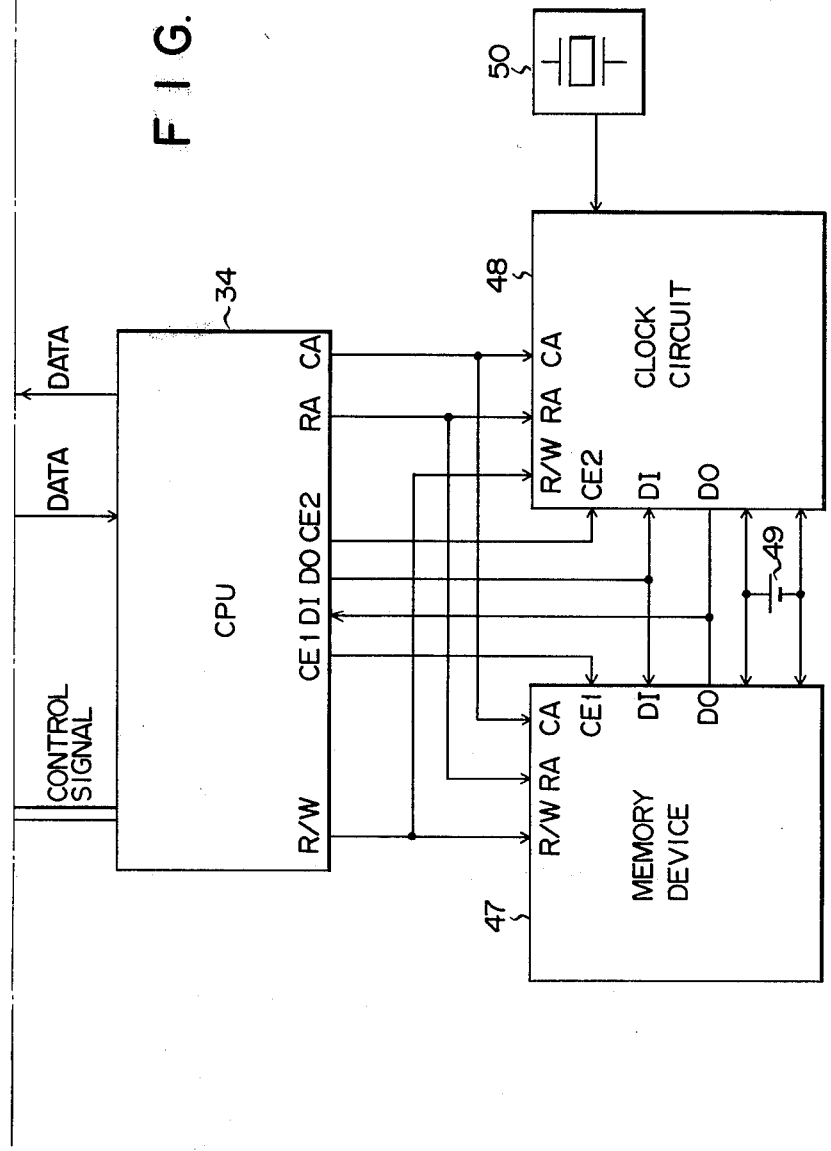

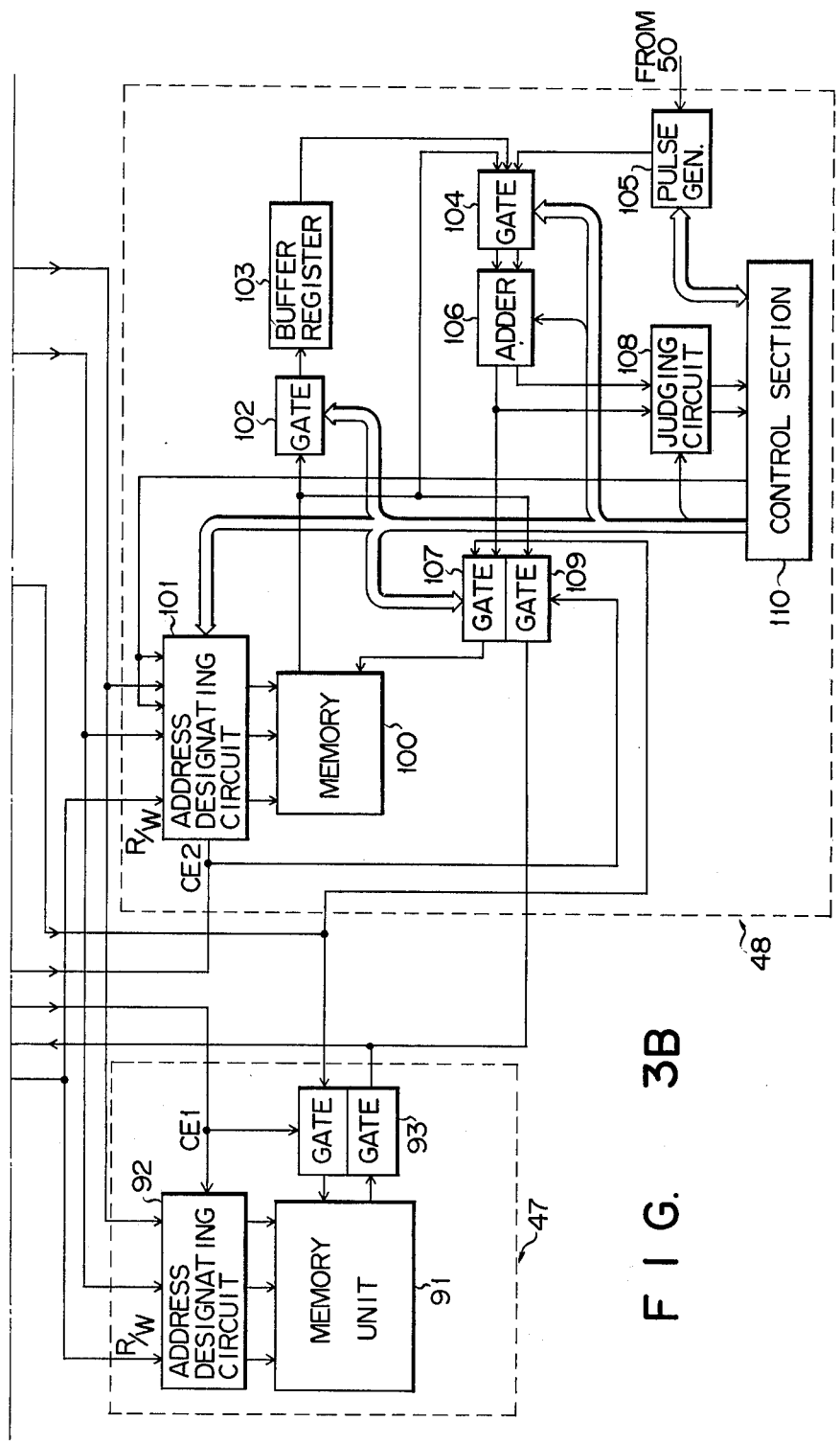
F I G. 3B

FIG. 4

| CA RA | B8 | B7 | B6 | B5 | B4 | B3 | B2 | B1 |
|---|---|---|---|---|---|---|---|---|
| 1 | A UNIT PRICE | | ITEM COUNT | | DEPARTMENT TOTAL | | | |
| 2 | A UNIT PRICE | | ITEM COUNT | | DEPARTMENT TOTAL | | | |
| ⋮ | ⋮ | | ⋮ | | ⋮ | | | |
| 16 | A UNIT PRICE | | ITEM COUNTS | | DEPARTMENT TOTAL | | | |
| 17 | CONSECUTIVE NUMBER | | SALES COUNTS BETWEEN TIMES T1 AND T2 | | SALES TOTAL BETWEEN TIMES T1 AND T2 | | | |
| 18 | | | SALES COUNTS BETWEEN TIMES T2 AND T3 | | SALES TOTAL BETWEEN TIMES T2 AND T3 | | | |
| 19 | | | SALES COUNTS BETWEEN TIMES T3 AND T4 | | SALES TOTAL BETWEEN TIMES T3 AND T4 | | | |
| 20 | | | RECEIPT COUNTS | | RECEIPT TOTAL | | | |
| ⋮ | | | | | | | | |
| n | | | | | NET SALES TOTAL | | | |

Columns 91C = B8–B7, 91B = B6–B5, 91A = B4–B1. Table 91.

F I G. 5A
| CA\RA | B8 | B7 | B6 | B5 | B4 | B3 | B2 | B1 |
|---|---|---|---|---|---|---|---|---|
| 1 | T1 HOUR | T1 MINUTE | T2 HOUR | T2 MINUTE | T3 HOUR | T3 MINUTE | T4 HOUR | T4 MINUTE |
| 2 | AL1 HOUR | AL1 MINUTE | AL2 HOUR | AL2 MINUTE | AL3 HOUR | AL3 MINUTE | AL4 HOUR | AL4 MINUTE |
| 3 | SV1 HOUR | SV1 MINUTE | SV2 HOUR | SV2 MINUTE | SV3 HOUR | SV3 MINUTE | SV4 HOUR | SV4 MINUTE |
| 4 | FLAG 1 | FLAG 2 | YEAR | MONTH | DAY | TIME | MINUTE | SECOND |
F I G. 5B
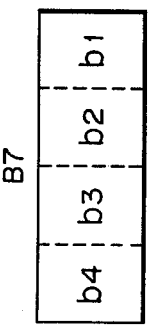

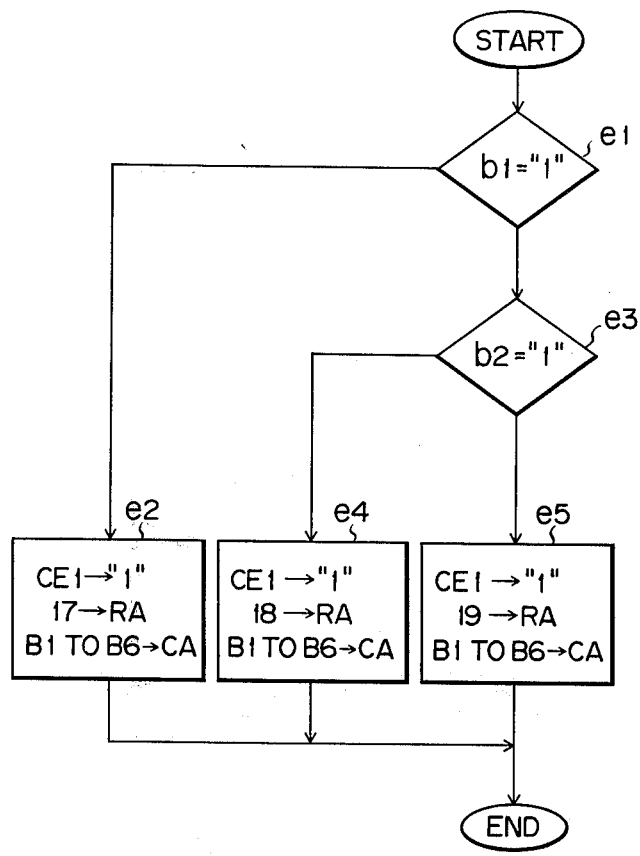

10:30

X REGISTER 700
B7  78a
4 |0001| ~100

A REGISTER |17 B1 TO B6| ~83

| 17 | B6 | B4 | 91 B1 |
|---|---|---|---|
|  |  | 20 | 13200 |

| 17 | B6 | B4 | B1 |
|---|---|---|---|
|  |  | 21 | 13900 |
91

11:50

X REGISTER 2000
B7
4 |0001|

A REGISTER |17 B1 TO B6|

| 17 | B6 | B4 | B1 |
|---|---|---|---|
|  |  | 57 | 38000 |

| 17 | B6 | B4 | B1 |
|---|---|---|---|
|  |  | 58 | 40000 |

12:01

X REGISTER 450
B7
4 |0010|

A REGISTER |18 B1 TO B6|

| 18 | B6 | B4 | B1 |
|---|---|---|---|
|  |  | 0 | 0 |

| 18 | B6 | B4 | B1 |
|---|---|---|---|
|  |  | 1 | 450 |

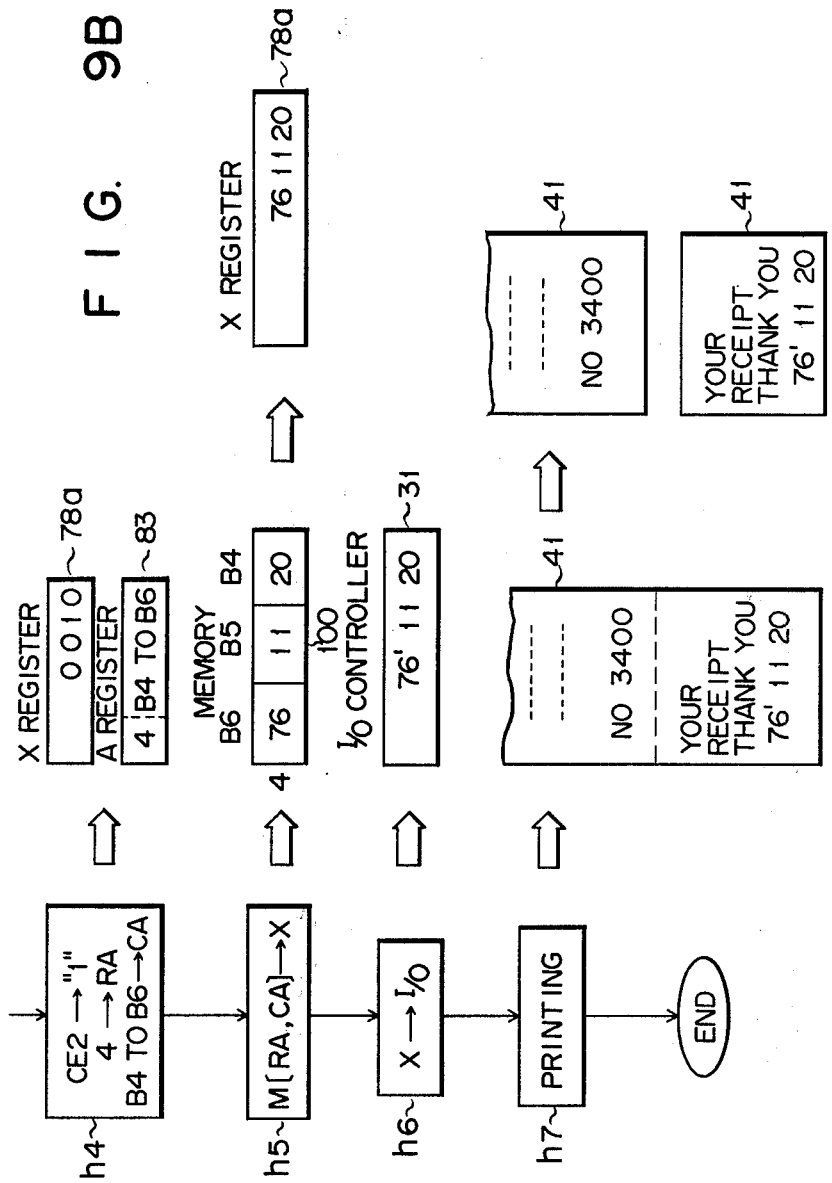

ELECTRONIC CASH REGISTER FOR TOTALIZING SALES DATA ON A TIME ZONE BASIS

BACKGROUND OF THE INVENTION

The present invention relates to an electronic cash register which includes a time counting function and automatically totalizes data such as the sale total, the item count and the like within a predetermined time.

Generally, in an electronic cash register, an amount of each goods is inputted by an entry key and then a department key of the department to which the goods sold belongs is operated. The inputted data is properly processed, assorted and accumulatively stored in memories allotted for totalizations of the sale amount and the item count for each department, the gross sale total of the day and the sale total for each clerk. At the end of the work day, the cash register is set to a reset mode to successively print out the various data stored in the corresponding memories and then these memories are cleared. These assorted sale data will be used for management materials. Therefore, it is preferable that the sale data are detailed and correct with brevity.

Since the conventional cash register is not provided with a clock function, it can totalize only one day's sales so that the data obtained is insufficient for such a purpose. If we know the sale condition at specific time zones of a day, for example, morning, afternoon, and evening, it would be effective and useful for management reference. Further, if the time counting function is extended to year, month, week and day, an operator can preset the time period for totalization, for example, a week, a month, every two days or the like. Accordingly, the totalization for longer periods than a day may be automatically made, resulting in remarkable improvement of the totalization function of the register.

In the conventional register, the operator must key the date data such as year, month and day at the beginning of the work day, for receipt issuing.

Accordingly, an object of the present invention is to provide an electronic cash register which can automatically totalize sales data within a given time zone, with proper time zones preset.

SUMMARY OF THE INVENTION

In accordance with the present invention, an electronic cash register comprises a keyboard including a data input key and a time zone setting key; a central processing unit coupled to the keyboard; a memory coupled to the central processing unit and having a plurality of memory places for storing accumulated sales amounts on a time zone basis; a time memory coupled to the central processing unit to store time zone defining time data by the operation of the time zone setting key; a timepiece coupled to the time memory to supply current time data; and a comparator coupled to the timepiece and to the time memory to compare current time data from the timepiece with the time data stored in the time memory. The central processing unit includes means for writing entry data in one memory place of the memory according to the time zone determined by the result of a comparison by the comparator when entry data from the keyboard is completed.

With such a construction, if the time zone for totalization is preset, the totalization of sales within the preset time zone may be automatically made. Therefore, the sales condition within a desired time zone may be sized so that more detailed materials including change of operators; supplement of goods and the like may be prepared which are useful for goods control and other management functions.

Further, if the time counting function is extended to include month and day, the date printing may be effected at the time of issuing a receipt without presetting the date data.

BRIEF DESCRIPTION OF THE DRAWINGS

FIGS. 2A and 2B cooperate to form a block diagram of the entire cash register;

FIG. 3B is a circuit diagram illustrating a memory circuit and a clock circuit in the FIG. 2;

FIG. 4 shows a memory map of the memory circuit;

FIGS. 5A and 5B show memory maps in the memory in the clock circuit;

FIGS. 6A and 6B show a flow chart for illustrating the operation of the circuit in time counting;

FIG. 7 shows data stored in the memory in the clock circuit;

FIGS. 9A and 9B schematically illustrate the printing operation of consecutive number and date.

DETAILED DESCRIPTION

Figure 1:
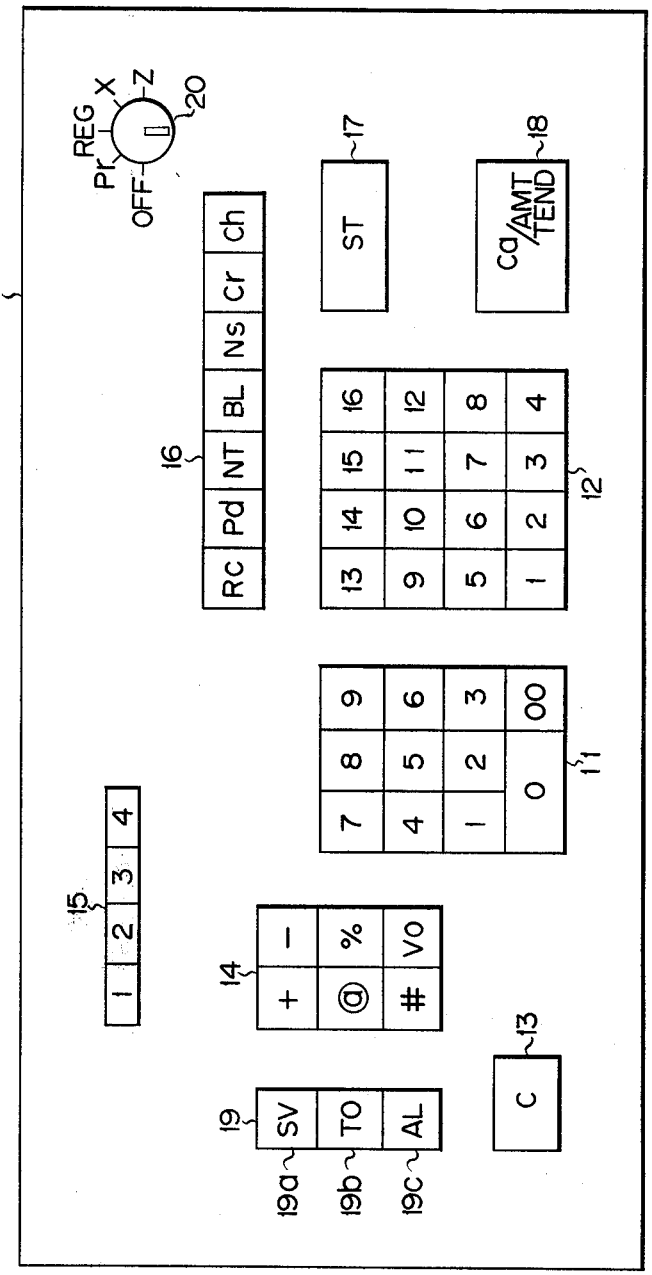
FIG. 1 shows a keyboard of an electronic cash register.

Referring now to FIG. 1, there is shown an arrangement of a keyboard 10 of an electronic cash register (ECR). In the figure, reference numeral 11 designates amount keys for entering numeral values such as cost, quantity, and the like of goods, 12 a department key for registering goods in group, and 13 a clear entry key for erasing numerals inputted by the amount key 11. A set of function keys designated by reference numeral 14 is comprised of keys representing non-add (#) for setting up the present time, void (Vo), multiplication (@), percentage (%) and (+) and (−) for indicating increase and decrease of the percentage. Reference numeral 15 designates a clerk key for entering a responsible person. A transaction key 16 is comprised of keys representing receipt (Rc), paid out (Pd), net total (NT), balance (BL), no sale (NS), credit (Cr), and charges (Ch). Reference numeral 17 designates a subtotal key for obtaining the interim result of a course of calculation. A cash/amount tender key (Ca/AMT) 10 is used for issuing a receipt for obtaining total or change. A time key 19 is used to set up time. 19a designates is a service key for setting up a service time zone. 19b sets up a time zone of totalization. 19c designates an alarm key (AL) for setting up an alarm time. The x keys 19a to 19c constitute the time key 19. A control lock 20 switches to select modes (OFF), (Pr), (REG), (X) and (Z). The (OFF) mode is used when the ECR is not used; the (Pr) mode for presetting data; the REG mode for normal registering operation; the (X) mode for reading operation without destroying data stored; and the (Z) mode for executing reset to clear data after the stored data is read out.

The following explanation is an elaboration of the internal construction of the electronic cash register according to the present invention. Reference numeral 31 is an I/O (input/output) controller which controls the keyboard 10 and a printing section 33. The I/O controller 31 applies a sampling signal to a keyboard 10. When a key is actuated on the keyboard 10, the sampling signal is selected responsive to the key actuation and is applied as a key input signal to the I/O controller 31. Upon receipt of the key input signal from the keyboard, the I/O controller 31 loads the key input signal into an input buffer register (not shown) for temporarily storing therein. The I/O controller 31 is coupled with a central processing unit (CPU) 34. When the CPU issues a control signal of an input instruction to the I/O controller 31, the key input signal in the input buffer is read into the CPU 34. When receiving printing data from the CPU 34, the I/O controller 31 loads the printing data into an output buffer (not shown) where it is temporarily stored therein. The printing section 33 is comprised of a receipt paper printer 36 and a detail paper printer 37. The printers 36 and 37 are provided with printing drums 38 and 39 which are coaxially arranged and have numerical characters on the surfaces, respectively. A receipt paper 41 and a detail paper 42 are disposed close to the printing drums 38 and 39, respectively. Printing hammers are disposed against the printing drums 38 and 39 with the receipt paper 41, the detail paper 42 and ink ribbons (not shown) therebetween, respectively. A printing position detecting device 44 is provided at one of the ends of the printing drum 38 and detects the printing positions of the printing drums 38 and 39 every specified rotational angles of the drums to produce detection signals. The detection signals are applied to the I/O controller 31 through an amplifier 45. When the printing position detection signal and the printing data coincide, the I/O controller 31 supplies a drive signal via a driver 35 to the printing hammer confronting the printing type at that time, thereby to drive the hammer. When the printing drums 38 and 39 revolve by one revolution, one line printing operation is completed and the receipt paper 41 and the detail paper 42 are fed by one line. As the printing operation progresses, the receipt paper 41 is guided out to exterior to permit the printed portion of it to be torn off, after the printing is completed. "YOUR RECEIPT THANK YOU", for example, is printed on the receipt paper 41. The same contents of printing as on the receipt paper 41 is recorded on the detail paper 42 for recording the net total which is taken up by a shaft 42.

A memory device 47 and a clock circuit 48 are coupled with the CPU 34. A power source 49 is coupled with both the memory device 47 and clock circuit 48 to place them to always be ready for their operations. The clock circuit 48 also is coupled with a reference frequency oscillator, for example, a crystal oscillator 50. The memory 47 and the clock circuit 48 are fabricated on a single chip. The CPU 34 produces a chip enable signal CE1 to specify the memory circuit 47 and another chip enable signal CE2 to specify the clock circuit 48. A read/write signal R/W from the memory 47 specifies the reading or the writing operation of the memory device 47. The clock circuit provides time data and day data which are read out by the CPU 34, if necessary. When the receipt is issued, the CPU reads out day information from the clock circuit 48 to cause the printing section to print the day of the receipt issued. The time data is used a time marking data when totalizing is performed in a given time. The CPU 34 executes receipt issuing operation in response to the key input signal from the keyboard. The processing data at that time is transferred as printing data to the I/O controller 31 and to a display section 24 through a display driver 51 where it is visualized.

Figure 3A:
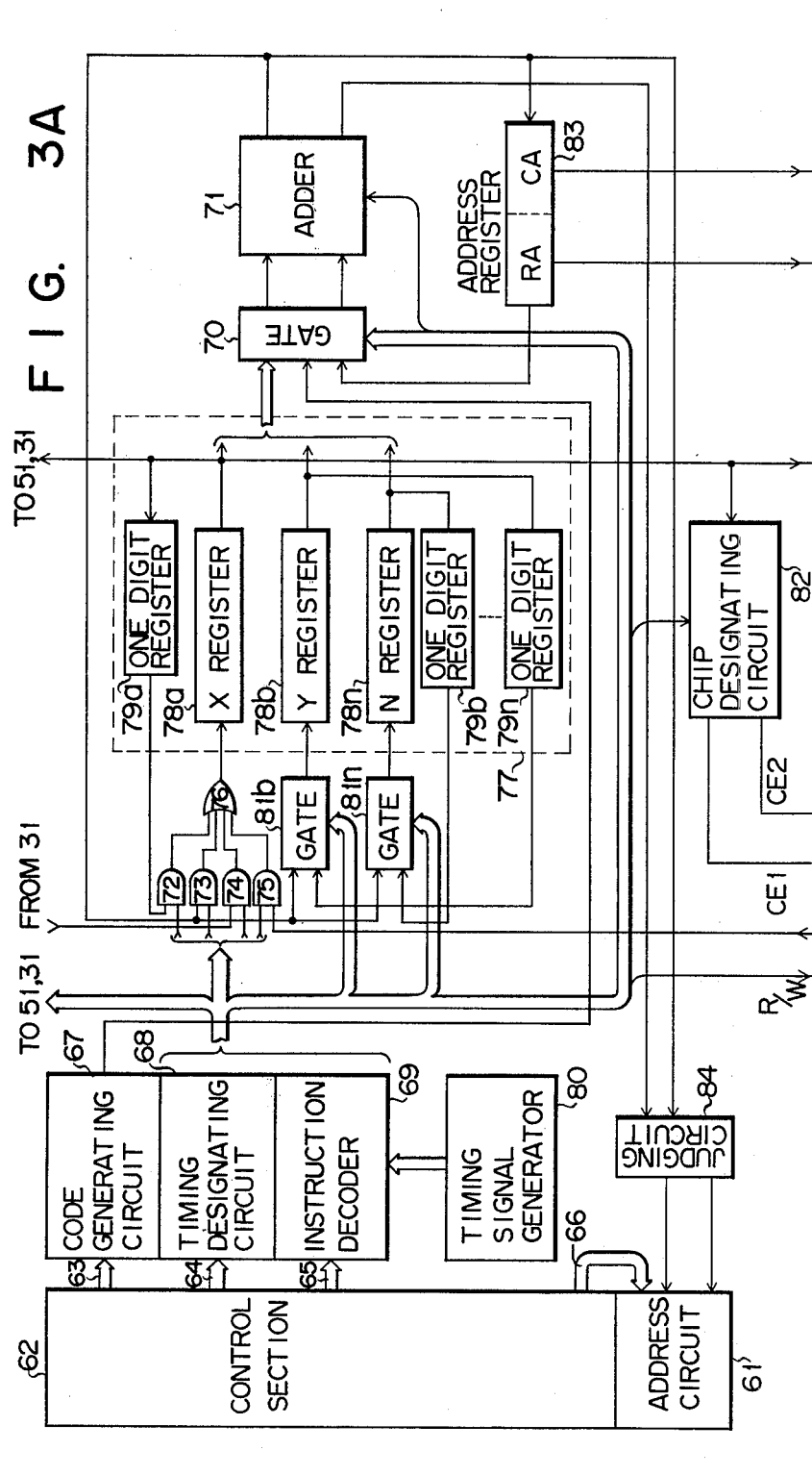
FIG. 3A is a circuit diagram of a CPU used in the circuit of FIG. 2.

FIGS. 3A and 3B cooperate to illustrate the details of the CPU 34, the memory device 47, and the clock circuit 48. The CPU 34 is first given. In the figure, an address circuit 61 specifies the address of a control section 62. The control section 62 includes a microprogram to control the operations of the respective circuits which is stored in a read only memory (ROM). The control section includes output lines 63 to 66. The output line 63 provides a code generation instruction; the output line 64 a given timing signal; the output line 65 various instructions, for example, a register specifying signal, a transfer instruction, a digit shaft instruction; and the output line 66 the next address of itself. The code generating instruction from the output line 63 is transferred to a code generating circuit 67. A timing signal from the output line 64 is transferred to a timing specifying circuit 68. The instructions from the output line 65 are transferred to an instruction decoder 69. The next address outputted to the output line 66 is transferred to an address circuit 61 for specifying the next address. A timing signal from a timing generating circuit 80 provided in the CPU 34 is applied to the code generating circuit 67, the timing instruction circuit 68, and the instruction decoder 69. The code generating circuit 67 converts parallel data of 4 bits, for example, given from the control section 62 at given timing into a serial code signal. The output of the code generating circuit 67 is transferred to an addition/subtraction circuit 71 through a gate circuit 70. The timing specifying circuit 68 specifies the operation timing of the register such as a digit specifying it in accordance with the timing signal fed through the output line 64 from the control section 62. The output signal thereof is applied as enabling and disabling signals to the respective gate circuits in the CPU 34 such as a gate circuit 70, and AND circuits 72 to 75. The outputs of the AND circuits 72 to 75 are applied through the OR circuit 76 to an input/output register 78a in the register group 77. The instruction decoder 69 decodes the instruction given from the control section 62 to control the operations in the respective portions in the CPU 34 such designation of the register in the register group 77 and gives a read/-write instruction to the memory 47 and the clock circuit 48. The outputs of the timing designating circuit 68 and the instruction register 69 are applied as control signals to the display driver 51 and the I/O controller 31. The register group 77 includes the X register 78a for input-/output, and other registers 78b to 78n denoted as Y to N. The output of the register group 77 is coupled with an adder/subtractor 71, through the OR gate 70. The output signal of the adder/subtractor 71 is applied to the AND circuit 73. The key input signal from the keyboard 10 is applied via the I/O controller 31 to the AND circuit 74. The output signals of the Y to N registers 78b to 78n are applied to gate circuits 81b to 81n, through registers 79b to 79n each with one digit memory capacity. The output signal of the adder/substractor 71 is also applied to the gate circuits 81b to 81n. The outputs of the gate circuits 81b to 81n are applied to the Y to N registers 78b to 78n, respectively. The output of the X register 78a is applied as display data or printing data to the display driver 51 and the I/O controller 31 and to a chip designating circuit 82. In accordance with an instruction from the control section 62, the chip designating circuit 82 reads out the chip designating data in the X register 78a and produces the chip enable signals CE1 and CE2 in accordance with the contents of it thereby to designate the memory 47 or the clock circuit 48. The output of the adder/substraction circuit 71 is loaded into an A register 83 for addressing. Data decoded by the A register 83 is inputted to the adder/subtraction circuit 71 through a gate circuit 70 and is divided into two addresses; an address RA of row and an address CA of column. These addresses are applied to the memory 47 and the clock circuit 48, respectively. Data and carry signals outputted from the adder/subtraction circuit 71 are transferred to a judging circuit 84. The judging circuit 84 judges whether the data or the carry from the circuit 71 presents or not and produces the result of the judgement towards the address circuit 61. At this time, the succeeding address outputted onto the output line 66 and the detection signal are logically summed so that the next address is changed.

The memory circuit 47 includes a memory unit 91, an address designating circuit 92 into which the read/write R/W instruction from the instruction decoder 69, the row and column addresses from the A register 83 are loaded. The address designating circuit 92 and the gate circuit 93 are enabled by the chip enabling signal $CE_1$ given from the chip designating circuit 82. Data read out from the memory body 91 through the gate circuit 93 is applied to the AND circuit 75 of the CPU 34, as previously stated. The output signal of the X register 78a in the CPU 34 is applied as write data to the memory unit 91, through the gate circuit 93. The memory unit 91 has a capacity of $n \times 8$, as shown in FIG. 4. The columns $B_1$ to $B_8$ are designated by the column address CA and the rows 1 to n are designated by the row address RA. The memory body 91 is divided into three regions; a first region 91A ranging from $B_1$ to $B_4$ columns, a second region 91B ranging from $B_5$ and $B_6$ columns, and a third region 91C ranging from $B_7$ to $B_8$ columns. In the first region 91A, the 1st to 16th addresses store the department total corresponding to the department key 12. The 17th address stores the sale total between the designating times $T_1$ to $T_2$. The 18th address stored the sale total between the specified time zone $T_2$ to $T_3$. The 19th address stores the sale total within the time range between the specified time zone $T_2$ to $T_4$. The 20the address stores the receipt total. Such a memory region will be called a time designating sale total memory region. In the second region, the item count is stored in addresses 1st to 16th. The sale count between the specified time zones $T_1$ to $T_2$, $T_2$ to $T_3$, and $T_3$ to $T_4$ are stored in the memory region 17th to 19th, repsectively. The receipt count is stored in the 20th address. Preset unit prices in the respective departments are stored in the 1st to 16th addresses of the third region 91C.

In FIG. 3B, the clock circuit 48 is provided with a memory 100 for storing the date of the day, the present time data, the preset time data and the like. The memory 100 is specified by the addresses RA and CA of row and column set in the address designating circuit 101 through the A register 83 in the CPU 34 and its read and write operations are specified by the R/W instruction fed from the instruction decoder 69. A control section 110 in the clock circuit 48 feeds an address code signal and the R/W instruction to the address designating circuit 101 for addressing the memory 100. The data outputted from the memory 100 is applied to a buffer register 103 via through a gate circuit 102 and to the gate circuit 104. The output of a buffer register 103 and a 1-second pulse for clocking from a pulse generating circuit 105 are applied to the gate circuit 104. The pulse generating circuit 105 operates in response to a reference signal from a crystal oscillator 50 and, in addition to the 1-second pulse, generates a timing signal defining the timings for the operations at the respective portions to be directed to the control section 110. The gate circuit 104 selects an input signal in accordance with a control signal from the clock section 110 and feeds it to the adder/subtraction circuit 106. The adder/subtraction circuit 106 executes addition or subtraction in accordance with an instruction from the clock control section 110, and feeds the result of the calculation as write data to the memory 100 through a gate circuit 107. The data and carry of the calculation result outputted from the adder/subtraction circuit 106 are applied to the judging circuit 108 for judging the memory mode of 60 or 24 scale and time coincidence, for example. The result of the judgement of the judging circuit 108 is transferred to the clock control section 110 which in turn produces a control signal for the next processing, on the basis of the judging result. The data read out from the memory 100 is applied to the AND circuit 75 in the CPU through a gate circuit 109. The gate circuits 107 and 109, and the addressing circuit 101 are enabled by the chip enable signal CE2 from the chip designating circuit 82. The gate circuits 102, 104, 107 and the adder/subtraction circuit 106, and the judging circuit 108 are controlled by a signal from the clock control section 110. The gate circuit 107 is controlled by the chip enable signal CE2 and signal from the clock control section 110. The memory 100 has a memory capacity 4 rows$\times$8 columns as shown in FIG. 5A, for example. The respective columns $B_1$ to $B_8$ are specified by the column address CA and the respective rows are specified by the row address RA. The 1st to 3rd rows store time data such as hour and minute for each two columns, i.e. $B_8$-$B_7$, $B_6$-$B_5$, $B_4$-$B_3$ and $B_2$-$B_1$. Additionally, time data for timed totalization $T_{01}$ to $T_{04}$ are stored in the 1st row; time data $AL_1$ to $AL_4$ in the 2nd row; and time data for service time $SV_1$ to $SV_4$ in the third row. The time data $T_1$ to $T_4$ define the net total time range; the time data $AL_1$ to $AL_4$ alarm time; and the time data $SV_1$ to $SV_4$ the service time of discount and the like. In the 4th row, the columns $B_8$ to $B_7$ store Flag 1 and Flag 2 to indicate the coincidence between the present time and the designated time; the columns $B_6$ to $B_4$ store "year", "month" and "day" of the day; and the columns $B_3$ to $B_1$ "hour", "minute" and "second" of the present time. In the memory location at the 4th row and the $B_7$ column of the memory 100, for storing the Flag 2, a binary "1" is stored in the first bit $b_1$ when the present time is between $T_1$ to $T_2$, in the second binary bit $b_2$ when it is between $T_2$ to $T_3$, and in the third bit $b_3$ when it is between $T_3$ to $T_4$.

In operation, the clock circuit 48 operates in accordance with the reference signal fed from the crystal oscillator 50. The reference signal outputted from the crystal oscillator 50 is applied to the pulse generating circuit 105 which produces the 1-second pulse and various timing pulses. The 1-second pulse produced from the pulse generating circuit 105 is applied to the adder/subtraction circuit through the gate circuit 104. The control section 110 sets the row address RA=4 to specifying the 4th row of the memory 100 and reads out the contents of the address from the memory 100 through a gate circuit 102 and loads it into the buffer register 103. The gate 104 selects the output of the buffer register 103 and the 1-second pulse from the pulse generator 105 and applies them to the adder/subtraction circuit 106 thereby to add the 1-second pulse to the second data on the $B_1$ column. The output signal of the adder/subtractor 106 is transferred to the memory 100 through the gate circuit 107, and written into the 4th row. In this manner, the contents of the 4th row of the memory 100 is always refreshed. The output of the adder/subtractor 106 is transferred to the judging circuit 108 where it is judged whether the result of the addition reaches a predetermined value or not and the result of the judgement determines the control operation in the clock control section. More specifically, when addition of the second pulse reaches the $B_1$ row of the 4th column, i.e. the second data reaches 60 seconds, this condition is judged by the judging circuit 108 and the clock control section adds "1" to the contents of the $B_2$ column of the 4th row, i.e. the minute data, while at the same time the second data is cleared. Succeedingly, a similar operation of carry control will be repeated in the order of minute—hour—month—year. Thus, clock operation will be executed for the time and date. At the initiation of the clock circuit 48, date and time must be correctly set. In the setting operation, the control switch 20 in FIG. 1, 20 set to the Pr mode and, under this condition, the amount key 11 is actuated in the order of year—month—day—hour—minute—second. In this case, the non-add key "#" is depressed every time unit data is entered into the ECR. The input data inputted through the respective key operations, i.e. from the keyboard 10, is transferred to the CPU 34 through the I/O controller 31 where it is entered into the X register 78a via the AND circuit 74 and the OR circuit 76 shown in FIG. 3. The input data stored in the X register 78a is transferred into the clock circuit 48 where it is loaded into the intersections of the 4th row and $B_6$ to $B_1$ columns through the gate circuit 107. In this manner, the date and time data are loaded into the memory 100 of the clock circuit 48 and, after finally the second data loading is completed, the above-mentioned clock operation will be performed.

When the time data for time totalization, the time data for service time, and time data for alarm time are written into the memory 100, it is performed by using the amount key 11, the $T_0$ key 19b, the SV key 19a, and the AL key 19c. For example, after the time data of hour is inputted by the amount key 11, the minute time data is inputted by the $T_0$ key 19b. After the operation of the $T_0$ key 19b, the time sequence specifying data "1" is inputted by the amount key 11, to specify the intersection of the 1st row and the $B_7$ and $B_8$ columns so that "hour" and "minute" of the time data $T_1$ are loaded thereinto. When the operation like the above-mentioned one is made by using the SV key 19a instead of the $T_0$ key 19b, the time data for service time is loaded into the memory 100 at the intersections of the 3rd row and the rows $B_7$ and $B_8$. Use of the AL key 19c writes the time data for alarm into the intersections of the 2nd row and the $B_7$ and $B_8$ columns.

For loading the preset data of department, the amount key 11 and the department key 12 are depressed under a condition that the control switch 20 is switched to the Pr position. In this operation, the key input data is transferred into the memory device 47 by way of the X register 78a. In the memory 47, the key input data is written into the 1st to 16th addresses in the 3rd region of the memory unit 91, through the gate circuit 93.

In processing the sales of goods, the control switch 20 is set to the REG mode and the unit prices of the goods sold are entered by the amount key 11. Then, the department key 12 to which the printing section 33 where it is printed on the receipt paper 41 and the detail paper 42. At the same time, the input data is displayed in the display 24 to which the input data is applied by way of the CPU 34 and the display driver 51 and is accumulated in the CPU 34. Further, data of the memory circuit 47 corresponding to the address specified by the department key 12 is read out into the CPU 34 where it is added to the data inputted and the result of the addition is written into the address of the memory device 47 specified. At this time, the price is added to a predetermined row of the first region 91A, and the item count is added to a predetermined row of the second region 91B. In this manner, the operation like the above-mentioned one will be repeated by operating the amount key 11 and the department key 12 for every goods sold. When the prices of all of the goods sold are entered and the department are specified, the key 18 of Ca/AMT-TEND is operated to issue a receipt, with totalization or change. The total amount thus obtained by the CPU 34 is displayed in the display section 24 and applied through the I/O controller 31 to the printing section 33 where it is printed on the detail paper 42 and the receipt paper 41. When it is processed by using the department preset key preset for each department as mentioned above, and without inputting the prices of goods the process like the above-mentioned one will be performed with the input data of the preset data of the address corresponding to the department key 12, through a mere operation of the department key 12.

The operation of the timed totalization will be described with reference to FIGS. 1 to 8. When data relating to the goods sold is inputted, the key input signal is applied to the CPU 34 through the I/O controller 31 and set in the register 78a. Then, the CA/AMT-TEND key 18 is actuated so that the data in the X register 78a is transferred to the Y register 78b, as shown in a step a in FIG. 6A. The data flow at this time is such that the data emanating from the X register 78a flows through the gate circuit 70, the adder/subtraction circuit 71, and the gate circuit 81b to the Y register 78b. At the next step b, the control section 62 reads out the chip specifying data to specify the memory 100 in the clock circuit 48 and the loads it into given digits in the X register 78a. The control section 62 issues an operation instruction to the chip specifying circuit 82. Upon receipt of the operation instruction, the chip designating circuit 82 reads out the chip designating data from a given digit of the X register 78a and produces the chip enabling signal CE2 to specify the memory 100. Then, the control section 62 produces addresses RA=4 and CA=$B_7$ to specify the intersection of the 4th row and the column $B_7$ of the memory 100. The addresses are converted into serial codes by the code generating circuit 67 and then the converted one is transferred to the adder/subtraction circuit 71 through the gate circuit 70. The addresses RA and CA outputted from the adder/subtractor 71 are inputted to the A register 83 where it is converted into parallel data which in turn transferred to the addressing circuit 101 in the clock circuit 48. A read instruction from the control section 62 is set in the instruction decoder 69, through the instruction decoder 69. That is, the chip enabling signal CE2 specifies the clock circuit 48 and the Flag 2 addresses the memory 100. Through the addressing in the step b, the Flag 2 stored in the location of the 4th row and the $B_7$ column M(4, $B_7$) of the memory 100 is read out and the read-out signal is transferred to the X register 78a, through the AND gate 75 and the OR circuit 76. When the present time is read out from the memory 100 into the buffer register 103, the clock circuit 78 successively reads out the time data of time totalization $T_1$ to $T_4$ from the memory 100 and applies them through the gate circuit 104 to the adder/subtraction circuit 106 to compare it with the present time stored in the buffer register 103. The result of the comparison is applied to the judging circuit 108. In the judging circuit 108, the service time, i.e. $T_1$ to $T_2$, $T_2$ to $T_3$, or $T_3$ to $T_4$, to which the present time belongs is searched and the binary "1" is loaded into the corresponding bit of the Flag 2 memory location $b_1$ to $b_3$ of the memory 100.

Assuming now that the time $T_1$ is preset to be 10:00; $T_2$ 12:00; $T_3$ 14:00; $T_4$ 17:00, and that, under this condition, the receipt paper is issued at 10:30 by depression of the key 18. As described above, $M(4, B_7)$ memory location of the memory 100 is addressed and the content of the Flag 2 is read out from the memory 100 into the output register 78a. The present time 10:30 resides in the time zone $T_1$ to $T_2$, i.e. 10:00 to 12:00, the binary "1" is set in the first bit $b_1$ of the Flag 2 so that the Flag 2 is "0001". As shown in the step c of FIG. 6, the contents "0001" of the Flag 2 read out into the register 78a is transferred into the judging circuit 84, through the gate circuit 70 and the adder/subtractor 71. The judging circuit judges whether any one of the bits of the Flag 2 includes "1" or not, as shown in a step d. When the result of the judgement is NO, i.e. the present time does not belong to the time zones, the timed totalization is not performed and the receipt is immediately issued. When the judgement is YES, i.e. the present time belongs to any one of the time zones, the process progresses to the step e in FIG. 6. In this step, the control section 62 causes the chip designating circuit 82 to produce the chip enable signal CE1 and addresses the memory device 47 to specify one of the 17th to 19th row addresses in accordance with the contents of the Flag 2. In this case, the present time resides in the time zone $T_1$ to $T_2$ so that the 17th row address of the memory device 47 is specified. Then, it progresses to a step f in FIG. 6A. In this step, the contents of M(RA, CA), e.g. the article number "20" in the time zone $T_1$ to $T_2$ and the subtotal "¥13,200" in the same zone is read out into the X register 78a. The contents of "¥13,200" in the X register 78a and the sales data, e.g. "¥700", stored in the Y register 78b are transferred to the adder/subtraction circuit 71, through the gate circuit 70. In the circuit 70, these are added. The article number "20" in the time zone $T_1$ to $T_2$ is also applied to the adder/subtraction circuit 71 where it is subjected to "+1" operation. Then, the total amount "¥13,900" in the time zone $T_1$ to $T_2$ and the article number "21" in the same time zone are loaded into the 17th address of the memory device 47.

Figure 6A:
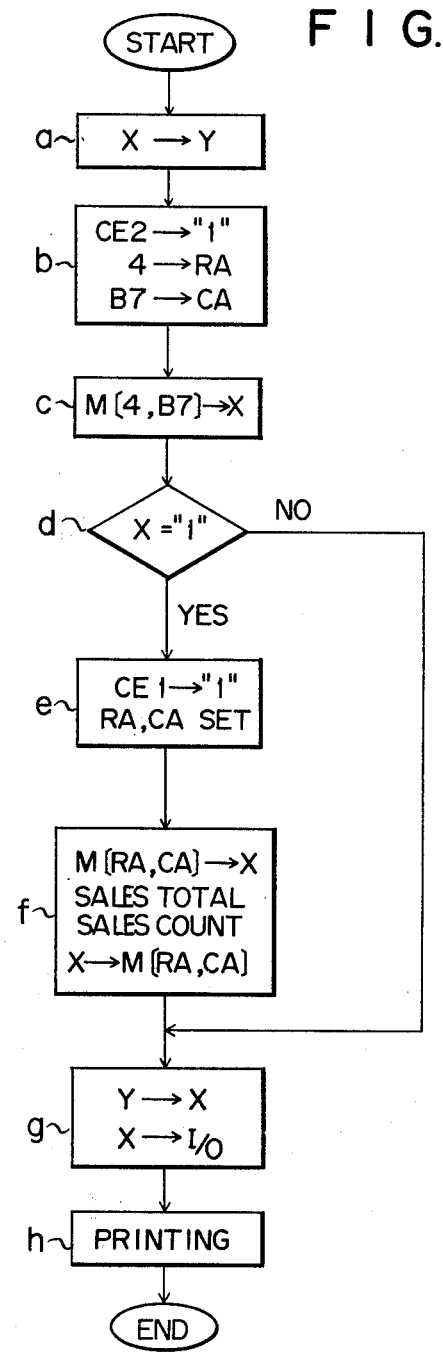

The detailed flow in the step e in FIG. 6A is shown in FIG. 6B. In a step $e_1$, it is judged whether "1" is set in the first bit $b_1$ or not, i.e. the contents of the Flag 2 is 0001 or not. If the "1" is set in the bit $b_1$, a step $e_2$ loads the chip enable signal CE1 into the X register 78a and further the row address RA=17 and the column address CA=$B_1$ are loaded into the A register 83. When the "1" is not set in the $b_1$ in the step $e_1$, a step $e_3$ is executed to see if the binary "1" is set in the second bit $b_2$ or not. If the "1" is set in the $b_2$, a step $e_4$ loads the chip enable signal CE1 into the X register 78a and sets the row address RA=17 and the column address CA=$B_1$ in the A register 83. If the "1" is not stored in the $b_2$ in the step $e_3$, a next step $e_5$ is executed. This step loads the chip enable signal CE1 into the X register 78a and the row address RA=19 and the column address CA=$B_1$ into the A address register 83.

Figure 8A:
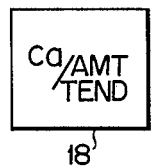
FIGS. 8A to 8C illustrate data stored in the memory and the register in the time counting.
Figure 8B:

FIG. 8B illustrates the case when the sales processing is made at 11:50.

Figure 8C:

When the sale processing is made after 12:00, for example, at 12:01 as shown in FIG. 8C, totalized and the receipt is issued, the locations of the 18th row and the columns $B_6$ to $B_1$ of the memory 100 are specified since, at this time, the second bit $b_2$ of the Flag 2 is set at "1" and therefore the contents of it is "0010". If this sale is the first one after 12:00, the contents of the 18th row and the columns $B_6$ to $B_1$ are all "0". Accordingly, the article number "1" in the time zone $T_2$ to $T_3$ is loaded into the memory locations the columns $B_6$ to $B_1$ and the 18th row with the total amount in the same time zone, for example, "¥450" of the sale amount at this time. After this, data totalization will be continued with respect to the memory locations of the 18th row and the columns $B_5$ to $B_1$ of the memory 100 till time $T_3$, i.e. 14:00.

Figure 9A:
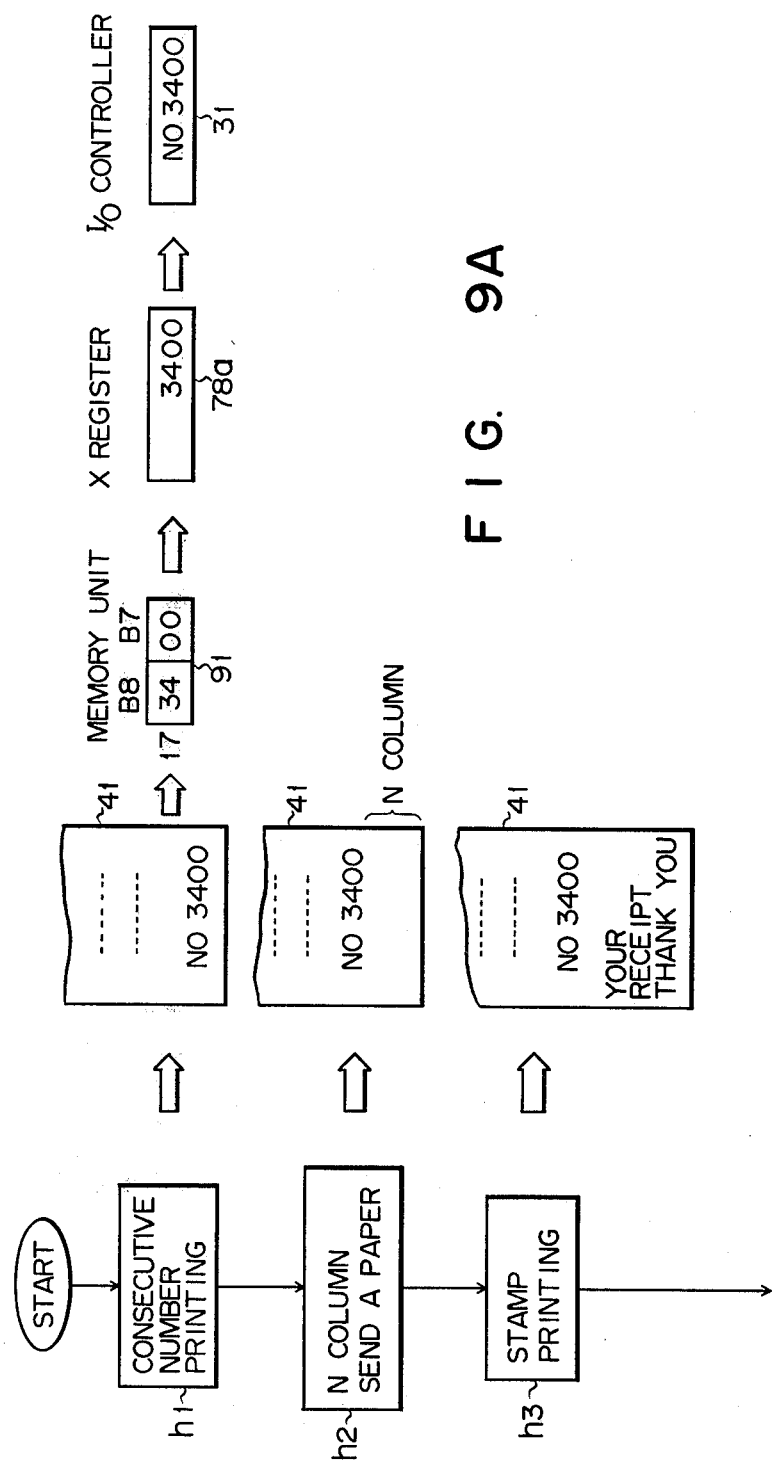

After 14:00, data will be totalized with respect to the memory locations of the 19th row and the columns $B_6$ to $B_1$ till $T_4$, i.e. 17:00 in this example. In this manner, the amount of money and the article number are totalized and then the operation advances to a step g. In this step, this sales data (the above-mentioned total amount) stored in the Y register 78b in the register group 77 is transferred to the X register 78a and then to the I/O controller 31, where it is stored in the output buffer register (not shown). The I/O controller controls the printing section 33 on the basis of the data stored in the output buffer register and prints the data as shown in step h of FIG. 6. In the step h, the printing shown in FIGS. 9A and 9B is made in addition to the data printing. Upon end of the data printing, the consecutive number is printed as shown in the step $h_1$ of FIG. 9A. At this time, the microprogram read out from the control section 62 sets the chip designating data to specify the memory device 47 in the X register 78a. Then, the microprogram of the control section 62 transfers an operation instruction to the chip designating circuit 82. Upon receipt of the operation program, the chip designating circuit 82 reads out the chip designating data from the S register 78a to produce the chip enable signal CE1 and to specify the memory device 47. Then, the control section produces an address code to specify the memory locations of the 17th row and the columns $B_8$ and $B_7$ of the memory unit 91. The address code then is converted into a serial code by the code generating circuit 67. The serial code converted is then transferred to the adder/subtraction circuit 71, through the gate circuit 70. The address data outputted from the adder/subtraction circuit 71 is loaded into the A register 83 where it is converted into parallel data to be fed to the address designating circuit 92. A read instruction fed from the control section 62 through the instruction decoder 69 is set in the addressing circuit 92. As a result, the contents of the memory locations of the 17th row and or columns $B_8$ and $B_7$, i.e. the consecutive number, for example, "3400", is read out from the memory unit 91 and the consecutive number is then applied to the X register 78a through the AND gate 75 and the OR circuit 76. The consecutive number read out from the X register 78a is transferred to the output buffer register in the I/O controller 31, together with "NO" shown in FIG. 9A. The data set in the output buffer register controls the operation of the printing section 33, to print the consecutive number "NA3400" on the receipt. The consecutive number "3400" read out into the X register 78a is applied to the adder/subtraction circuit 71 where it is subjected to the "+1" operation. Through this addition, the consecutive number becomes "3401" which in turn loaded into the memory locations of the 17th row and the columns $B_8$ and $B_7$ of the memory unit 91.

When the printing operation of the consecutive number is completed, the CPU 34 issues a paper feed instruction to the I/O controller 31. As a result, the paper feed of N columns is executed of the receipt, as shown in a step $h_2$ in FIG. 9A.

Then, the CPU 34 transfers a stamp printing instruction to the I/O controller 31 so that "YOUR RECEIPT THANK YOU" is printed, as shown in a step $h_3$ in FIG. 9A.

When the stamp printing is completed, the operation shifts to the date printing mode so that the CPU 34 performs a chip designation to the clock circuit 48 and an addressing of the date to the memory 100. That is, the CPU 34 transfers a code designating the chip of the clock circuit 48, e.g. "0010" to the X register 78a, and at the same time issues an operation instruction to the chip designating circuit 82, through the control section 62. Upon receipt of the operation instruction, the chip designating circuit 82 reads out the chip designating code "0010" from the X register 78a, and produces the chip enable signal CE2 to designate the chip of the clock circuit 48. Then, the control section 62 transfers the address data to the address register 83, through the gate circuit 70 and adder/subtraction circuit 71. The address data specifies the memory locations of 4th row and the columns $B_6$, $B_5$ and $B_4$. The address data is transferred from the address register 83 the address designating circuit 101 in the clock circuit 48. In the address designating circuit 101, a read instruction is set which is fed from the control section through the instruction decoder 69. As a result, the date data, for example, if it is Nov. 20, 1976, "76 11 20", is read out from the memory locations of 4th row and of columns $B_6$, $B_5$ and $B_4$ of the memory 100 as shown in a step $h_5$ of FIG. 9B. The date data read out is transferred to the X register 78a, through the gate circuit 109, the AND circuit 75 and the OR circuit 76. The date data read out into the X register 78a is transferred to the output buffer register in the I/O controller, together with the segment code, as shown in a step $h_6$ of FIG. 9B. The I/O controller 31 controls the printing section 33 in accordance with the data stored in the output buffer register to print the date, as shown in a step $h_7$ in FIG. 9B. The receipt issuing operation is made in the above-mentioned manner. The stamp printing "YOUR RECEIPT THANK YOU" and the printing of data are made for the succeeding receipt. As shown in FIG. 9B, the receipt is torn off between the consecutive number printing with N rows space and the stamp printing. Therefore, the stamp printing and the date printing are positioned at the upper portion of the receipt issued.

In the above-mentioned embodiment, the time and date are set up by setting the control switch 20 to the Pr mode and alternately depressing the amount key 11 and the non-add key "#". However, year, month, day, hour, minute, and second may be consecutively inputted by using the amount key and finally actuating the non-add key "#", for the same pulse. When the totalizing time is set up, hour and minute may be continuously inputted by the amount key 11 and then operating the totalizing key $T_0$ 19b, unlike the above-mentioned example. Since the totalizing key $T_0$ 19b is separately provided, it may be placed to always be settable irrespective of the mode of the control switch 20. If the totalizing key $T_0$ 19b is desired to be substituted by another key, the ST key 17 or the like may be used under a condition that the control switch 20 is switched to the Pr mode, for example.

In the above-described embodiment, the memory unit 91 has a plurality of memory places for storing a sales item total in connection with a time zone. The memory places are shown in the sales item total between times T1 and T2 and T3, and T3 and T4. The sales item total is cumulatively stored in one memory place according to the result of comparison by the comparator and according to the FIG. 6A flow chart when entry is made by the operation of the cash amount tendered key. The memory unit 91 can be so constructed that it has a plurality of memory places for storing a department sales item total in connection with the time zone. The department sales item total is cumulatively stored in one memory place by the same operation as in the flow chart of FIG. 6A. This effected according to the result of comparison made by the comparator, when an entry per department is effected by the operation of the department key 12.

The memory unit 91 can also be so constructed that it has a plurality of memory places for storing individual transaction amounts in connection with the time zone. The transaction amount is cumulatively stored in one memory place by the same operations as in the flow chart of FIG. 6A. This storing is done according to the result of comparison by the comparator.

The above-mentioned memory unit 91 can be so constructed that it has a plurality of memory places for storing a clerk sales amount in connection with the time zone. The clerk sales amount is stored in one memory place in connection with a clerk designated by a clerk key 15. This storing is done according to the result of comparison by the comparator and according to the FIG. 6A flow chart each time the sales amount is entered.

The total and count may be totalized not only within time but also within the date. In this case, the memory location for storing the total and count of the preset date is provided and every time the registration is made, the preset date is compared with the date of that registration to accumulatively store the total and count in the given memory location.

What we claim is:

1. In an electronic cash register, the improvement comprising the combination of:
 a keyboard including a data input key and a time zone setting key; a central processing unit coupled to said keyboard;
 a memory means coupled to said central processing unit and having a plurality of memory places for storing accumulated sales amounts on a time zone basis;
 a time memory coupled to said central processing unit to store time zone defining time data by the operation of said time zone setting key;
 a timepiece coupled to said time memory to supply current time data; and
 a comparator coupled to said timepiece and to said time memory to compare current time data from said timepiece with the time data stored in said time memory;

said central processing unit including means for writing entry data in one memory place of said memory means according to the time zone determined by the result of comparison by said comparator when entry data from said keyboard is completed.

2. An electronic cash register according to claim 1 wherein said keyboard has a cash amount tendered key for indicating termination of an entry operation; said memory means has a plurality of memory places for storing a sales item total in connection with the time zone; and said comparator is coupled to, and responsive to operation of, said cash amount tendered key for causing a sales item total to be cumulatively stored in one of said plurality of memory places according to the result of comparison by said comparator when an entry operation is completed as indicated by said operation of said cash amount tendered key.

3. An electronic cash register according to claim 1 wherein said keyboard has a department key for effecting a department data entry; said memory means has a plurality of memory places for storing a department sales item total in connection with a time zone; and said comparator is coupled to, and is responsive to operation of, said department key for causing a department sales item total to be cumulatively stored in one of said plurality of memory places according to the result of comparison by said comparator, when entry per department is effected by the operation of said department key.

4. An electronic cash register according to claim 1 wherein said keyboard has a transaction key for effecting a department data entry including a balance, net total, receipt paid, charge etc.; said memory means has a plurality of memory places for storing a department total in connection with the time zone; and said comparator is coupled to, and is responsive to operation of, said transaction key for causing a department amount to be cumulatively stored in one memory place of said plurality of memory places according to the result of comparison by said comparator when a department data entry is effected by said operation of said transaction key.

5. An electronic cash register according to claim 1 wherein said keyboard has a clerk key for indicating a clerk who enters a sales amount; said memory means has a plurality of memory places for storing a clerk sales item total; and said comparator is coupled to, and is responsive to operation of, said clerk key for causing a sales amount to be stored in one of said plurality of memory places with respect to a clerk designated by an operated clerk key, said storing of said sales amount being effected according to the result of comparison by said comparator each time entry is effected with respect to a sales amount.

6. An electronic cash register according to claim 1 wherein said time memory has a memory area for storing current time data.

7. An electronic ash register according to claim 6 in which said timepiece comprises a source of a reference signal; a pulse producing circuit for frequency-dividing the reference signal; a calculation circuit for successively and additively time-counting the pulse signal from said pulse producing circuit; and means for supplying current time data from the calculation circuit to said time memory.

8. An electronic cash register according to claim 6 wherein said time memory includes a memory region for storing a flag indicative of a result of comparison made by said comparator between said current time data and said time data.

9. An electronic cash register according to claim 6 wherein said time memory means has a memory area for storing an alarm time.

10. An electronic cash register according to claim 9 wherein said time memory includes a further memory region for storing a flag indicating a result of comparison made by said comparator between said current time and said alarm time.

11. An electronic cash register according to claim 1 wherein said time memory, timepiece and comparator are constructed on a single semiconductor chip.

12. In an electronic cash register, the improvement comprising the combination of:
a keyboard including a data input key;
a central processing unit coupled to said keyboard;
a memory coupled to said central processing unit and having a memory place for storing accumulated sales amounts;
a time memory coupled to said central processing unit and having a memory place for storing year, month and day data;
a timepiece coupled to said time memory to supply current time data and to update said year, month and day data; and
printing means coupled to said time memory to print on a receipt paper said year, month and day data which is stored in said time memory when registering is completed.

* * * * *